No. 712,884. Patented Nov. 4, 1902.
W. WOOD.
BUSHING FOR ROCK DRILLS.
(Application filed Jan. 3, 1902.)
(No Model.)
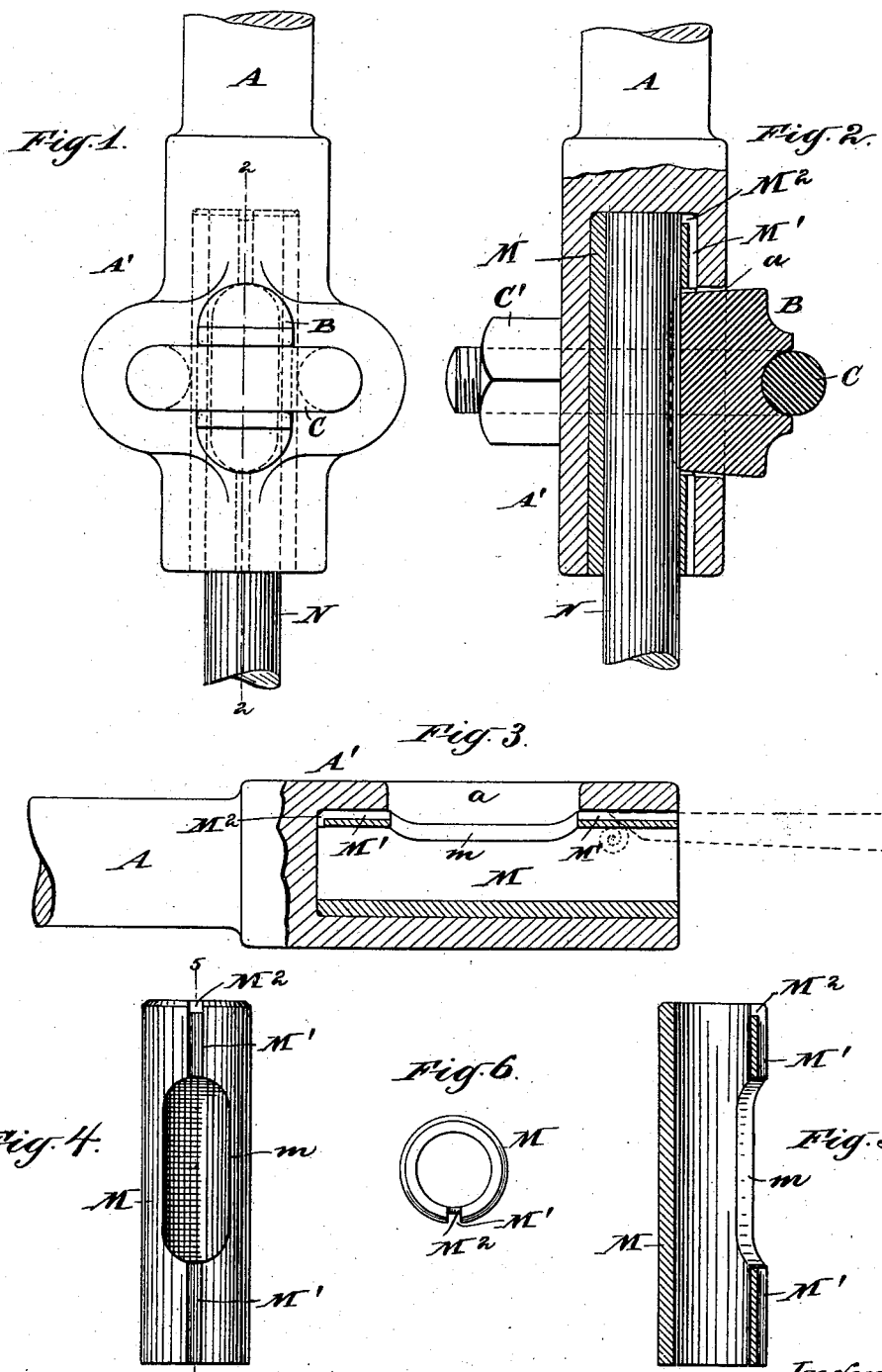

UNITED STATES PATENT OFFICE.

WARREN WOOD, OF PATERSON, NEW JERSEY.

BUSHING FOR ROCK-DRILLS.

SPECIFICATION forming part of Letters Patent No. 712,884, dated November 4, 1902.

Application filed January 3, 1902. Serial No. 88,274. (No model.)

*To all whom it may concern:*

Be it known that I, WARREN WOOD, a citizen of the United States, residing in Paterson, in the county of Passaic and State of New Jersey, have invented a certain new and useful Improvement in Bushings for Rock-Drills, of which the following is a specification.

The invention relates to bushings employed in receiving and centering the drill-shank in the chuck at the outer end of the reciprocating rod.

The reaction due to the impact of the drill upon the rock eventually changes the shape of the interior of the bushing and results in throwing the axis of the drill out of the axial line of the rod and causes a correspondingly-eccentric movement of the drill-point. When thus worn, it becomes necessary to remove the distorted bushing and substitute a new one. Generally it is found that the concussions of the drill have expanded the bushing into such strong contact with the interior of the chuck that such removal is very difficult and often impossible with the tools and conveniences at the command of the drill operator.

The object of my invention is to provide a bushing which may be easily removed when worn and also serve reliably when in place in the chuck. I attain these objects by producing a longitudinal groove on the exterior of the tubular bushing, which when in position in the chuck offers a weakened strip easily followed by a shearing-tool guided in the groove by which the strip or thin portion between the groove and interior may be sheared away. The bushing then may be collapsed and withdrawn.

The invention also consists in certain details of construction to be hereinafter described.

The accompanying drawings form a part of this specification and show the invention as I have carried it out.

Figure 1 is an elevation of a rock-drill chuck equipped with my invention. Fig. 2 is a corresponding vertical section taken on the line 2 2 in Fig. 1. Fig. 3 is a section similar to Fig. 2, but arranged horizontally and with certain parts removed, showing in dotted lines the operation of shearing the bushing along the line of the groove. The remaining figures show the bushing alone. Fig. 4 is an elevation; Fig. 5, a section on the line 5 5 in the preceding figure, and Fig. 6 is an end view.

Similar letters of reference indicate the same parts in all the figures.

A is the reciprocating rod, which may be understood to be the exteriorly-projecting portion of the piston-rod of a steam or compressed-air rock-drill of the usual or any preferred type. The rod A terminates in a head A', which with the means for holding a drill-shank N constitute the chuck. The interior of the head is bored axially and has a lateral slot or opening $a$ communicating with the bore and receiving a bearing-piece or chuck-key B, forced into strong frictional contact with the drill-shank by a U-shaped yoke or chuck-bolt C, having its bight engaged in a corresponding depression in the key and its arms extending through suitable holes in the head A and engaged by the nuts C', by which the key is drawn strongly against the drill-shank. All these parts comprising the chuck may be of the usual or any approved forms and construction.

The bushing is marked M and consists of a short tube or sleeve, preferably of hardened steel, having an outside diameter to match closely to the bore of the head A, in which it is received, and having a slot or opening $m$ corresponding to the slot $a$ to allow the key B to engage the drill-shank fitted to the interior of the bushing.

M' is a longitudinal groove or score on the exterior of the bushing in line with the center line of the slot $m$ and extending to the latter from each end. The groove, which is preferably of rectangular section, is produced by milling or otherwise and has a depth of one-half or two-thirds the thickness of the metal forming the cylindrical wall of the bushing. At the inner end the groove extends completely through, forming the notch $M^2$, as shown.

When the bushing is in place, it performs the usual function of centering the drill and protecting the interior of head A against distortion by the inclosed drill-shank. When the concussions and strains of continued use have changed the shape of the bushing and necessitated its removal and the substitution of a new one or for any reason the bushing is to be withdrawn and is found to be so firmly fixed in place that it cannot be driven out by ordinary means, I introduce a cape-chisel or similar tool of a width to enter the groove M' with the beveled face of the tool downward and by blows of a hammer force the tool along the groove and shear away the thin strip of metal forming the bottom of the groove, as indicated by the dotted lines in Fig. 3, until the slot $m$ is reached and the chip released. The tool is again engaged in the groove beyond the slot and the operation continued until the entire length of the groove has been traversed and the bushing thus cut longitudinally. The notch $M^2$ receives the point of the tool and insures a complete severance of the metal of the bushing before the point shall be arrested against the metal of the head. Thus divided the bushing may be driven out by blows on a suitable tool introduced through the slot $a$, or, if found necessary, the bushing may be first loosened by inserting the edge of the same or another chisel between the bushing and metal of the head at points adjacent to the cut, and thus' by bending reduce the diameter of the bushing sufficiently to cause it to relax its hold on the interior of the head. It may then be driven out, as before.

The operation is so simple that it may be performed by the drill operator, and the labor and expense of removing the apparatus from the vicinity of the workings to a more or less remote machine-shop, together with the difficulty of withdrawal encountered in ordinary forms of bushings, are avoided.

The expense of manufacturing the bushing in the improved form is slight, and its efficiency in holding the drill-shank is not impaired.

The shapes and proportions of the bushings may be varied to suit conditions. The line of the groove need not necessarily coincide with the slot $m$, but may be at any desired portion of the bushing, and the notch $M^2$ may be of greater or less depth than here shown. The depth and cross-sectional form of the groove may be varied.

I claim—

1. As an improved article of manufacture, a tubular bushing having a connecting portion at each end weakened longitudinally to allow of its removal by cutting away the weakened portion, substantially as described.

2. The tubular bushing M, having the slot $m$, groove M' and notch $M^2$, adapted to serve with a drill-shank and drill-chuck substantially as specified.

3. A tubular bushing weakened by a longitudinally-extending groove, in combination with a drill-chuck receiving the bushing, the said groove serving as a guide for the introduction and operation of a tool whereby the thin metal may be removed by shearing along said groove to facilitate the withdrawal of the bushing from said chuck.

In testimony that I claim the invention above set forth I affix my signature in presence of two witnesses.

WARREN WOOD.

Witnesses:
ROBERT D. BUCKLEY,
CHARLES R. SEARLE.